US007398285B2

(12) United States Patent
Kisley

(10) Patent No.: US 7,398,285 B2
(45) Date of Patent: Jul. 8, 2008

(54) APPARATUS AND SYSTEM FOR ASYNCHRONOUS REPLICATION OF A HIERARCHICALLY-INDEXED DATA STORE

(75) Inventor: Richard Victor Kisley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/630,181

(22) Filed: Jul. 30, 2003

(65) Prior Publication Data

US 2005/0027748 A1    Feb. 3, 2005

(51) Int. Cl.
*G06F 12/00* (2006.01)
(52) U.S. Cl. ..................................... 707/201
(58) Field of Classification Search ......... 707/200–205, 707/100–104; 711/162
See application file for complete search history.

(56) References Cited

U.S. PATENT DOCUMENTS

| 5,806,074 | A | 9/1998 | Souder et al. ............... 707/201 |
| 5,937,414 | A | 8/1999 | Souder et al. ............... 707/203 |
| 6,289,356 | B1 | 9/2001 | Hitz et al. ................... 707/201 |
| 6,324,654 | B1 | 11/2001 | Wahl et al. ..................... 714/6 |
| 6,434,681 | B1 * | 8/2002 | Armangau ................... 711/162 |
| 6,957,221 | B1 * | 10/2005 | Hart et al. .................... 707/100 |
| 7,010,553 | B2 * | 3/2006 | Chen et al. ................... 707/203 |
| 7,039,663 | B1 * | 5/2006 | Federwisch et al. ......... 707/205 |
| 7,043,485 | B2 * | 5/2006 | Manley et al. ............... 707/100 |
| 7,047,380 | B2 * | 5/2006 | Tormasov et al. ........... 711/162 |
| 2002/0129214 | A1 | 9/2002 | Sarkar ........................ 711/162 |
| 2002/0178335 | A1 | 11/2002 | Selkirk et al. ............... 711/162 |

FOREIGN PATENT DOCUMENTS

WO    WO 01/57641    8/2001

* cited by examiner

*Primary Examiner*—Sathyanarayan Pannala
(74) *Attorney, Agent, or Firm*—Kunzler & McKenzie

(57) ABSTRACT

Changes such as write operations on a replication source comprising a hierarchically-indexed file system and associated data store are tracked and aggregated over a point-in-time image replication interval and communicated to a replication target. The replication target receives the changes, conducts operations to make the changes on a target volume or portion thereof, and conducts a point-in-time image replication operation to synchronize the replication target with the replication source. In the present invention the advantages of replication techniques developed for log-structured file systems are provided to systems with conventional hierarchical file systems. The invention also facilitates maintaining point-in-time retrievable images of a volume or portion thereof on a target volume while reducing the bandwidth and processing burden associated with replication.

18 Claims, 5 Drawing Sheets

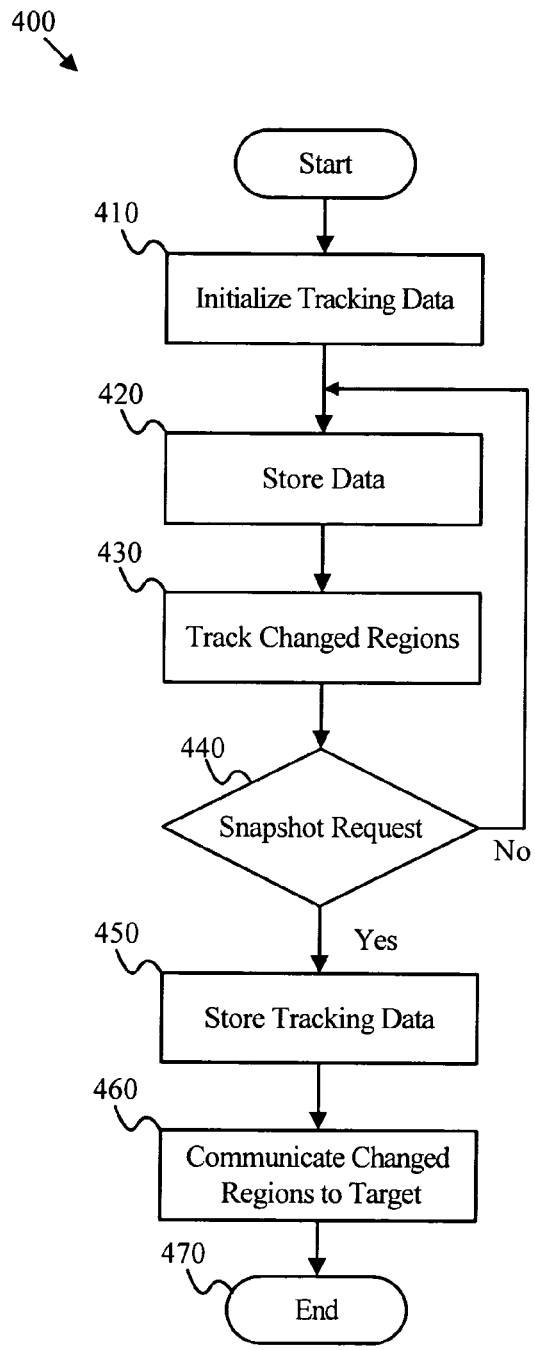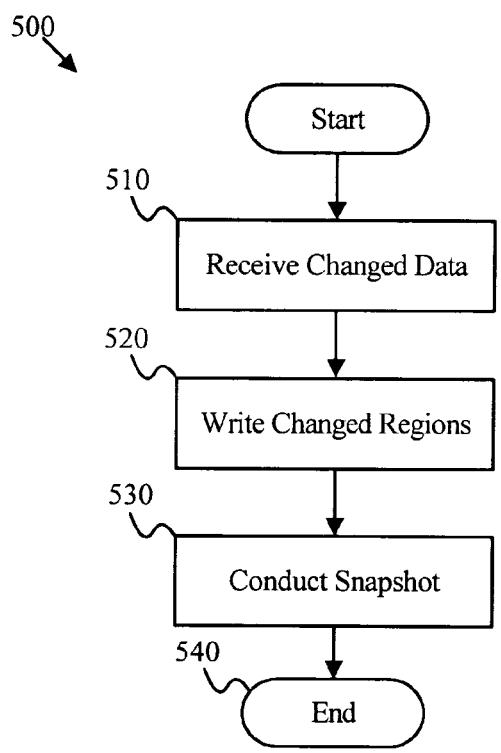
Fig. 4
Fig. 5

600

| Snapshot Change Map | | | | |
|---|---|---|---|---|
| Index | Block Address | Status | File | Region |
| 1 | 14763 | Unchanged | 3473 | 1 |
| 2 | 14764 | Unchanged | 3473 | 2 |
| 3 | - | - | - | - |
| 4 | 32603 | Changed | 3486 | 1 |
| 5 | 32604 | Changed | 3486 | 2 |
| 6 | 32605 | Unchanged | 3486 | 3 |
| 7 | - | - | - | - |
| N-3 | 109736 | Unchanged | 4178 | 1 |
| N-2 | 109738 | Changed | 4178 | 2 |
| N-1 | - | - | - | - |
| N | 5832 | Unchanged | 173 | 1 |

APPARATUS AND SYSTEM FOR ASYNCHRONOUS REPLICATION OF A HIERARCHICALLY-INDEXED DATA STORE

BACKGROUND OF THE INVENTION

1. The Field of the Invention

The invention relates to computer systems that increase information availability by maintaining duplicate copies. Specifically, the invention relates to devices, methods, and systems for replicating information from a hierarchically-indexed data store to a backup data store.

2. The Relevant Art

Data processing systems often maintain duplicate storage volumes or other data stores. To create and maintain duplicate data stores, data from a source volume is replicated onto a target volume. Data replication techniques generally include backup and archival storage techniques, data mirroring techniques, and the like.

Some existing data replication systems replicate data in a synchronous, atomic manner in order to maintain coherency between the source and target volumes. Synchronous replication techniques often halt further data processing until an acknowledgment has been received that a write operation performed on the source volume has also been performed on the target volume. Consequently, synchronous replication techniques may significantly degrade data replication performance, particularly when replication takes place over a high-latency communication line.

Multiple techniques have been devised to minimize performance degradation while achieving an acceptable level of coherency between source and target volumes. One technique is periodic full-copy replication, where an entire volume is replicated to a target volume in order to provide an exact copy of a source volume image at a specific time. Disadvantages of periodic full-copy replication include inefficient usage of resources to copy data that has not changed since a previous replication and the necessity to ensure that the source volume is not changed during replication.

Another technique for efficient data replication is incremental replication, where the source is replicated on the target as a baseline volume, and thereafter only changes to the source are replicated to the target on a periodic basis. One disadvantage of incremental replication is the necessity to ensure that the source volume is not changed during identification and replication of changed data.

Point in time replication techniques, such as snapshot operations, may save the system state information as well as changed data. Such techniques have been used to alleviate the need to suspend processing during incremental replication. Some data replication systems that require continual access to replicated data use snapshot techniques to implement data mirroring. Currently available snapshot replication techniques facilitate restoration of a source volume to a previous desired state and restoration of a particular image on the source volume.

One existing method for conducting snapshot-based replication involves saving a periodic snapshot of a source volume within an incremental system log and replicating both the log (including the incrementally changed data) to a target volume, where the snapshot includes all data modifications made to the source volume since a previous snapshot. Using an incremental log simplifies the process of replicating changes to a target system. Since the replication is based on specific snapshots, replication of the source image may occur as asynchronous to the actual write operations.

FIG. 1 is a block diagram illustrating a typical prior art log-structured mirrored data store 100 and associated snapshots. The depicted log-structured mirrored data store 100 includes a source volume 100a and a target volume 100b. As depicted, the source volume 100a includes one or more snapshot instances 120 and file writes 122, and the target volume 100b includes target snapshot instances 130 and replicated files communicated from the source volume 100a.

Typically, the file write entries 122 correspond to data written to sequential logical data blocks on a storage device corresponding to the source volume 100a. Each snapshot instance 120 may contain a copy of a current block map for the source volume 100a at the time that the snapshot instance 120 is taken. The block map is a master index linking file names and attributes with the associated data blocks that constitute the files.

The target file writes 132 are copies of the source file writes 122, written asynchronously to the target volume 100b after creation of the snapshot instance 120. The target snapshot instances 130 may contain copies of the current block map for the target volume 100b written to the target volume log directly following the target file writes 132. The target snapshot instances 130 may be identical to the corresponding source snapshot instances 120.

While the depicted approach creates a complete and consistent image of a source volume by replicating only the changed data, the depicted approach functions only on systems that use log-structured file systems.

FIG. 2 is a block diagram illustrating a typical prior art hierarchically-indexed data store 200 and associated snapshots. The depicted hierarchically-indexed data store 200 includes a master data block 210, a master index block 220, one or more file index blocks 222, one or more data files 250, a snapshot tracking system 230 including a snapshot map 232, one or more snapshot files 240 and associated snapshot headers 234, snapshot indices 236, and archived data blocks 238.

The master data block 210 points to the master index block 220. The master index block 220 points to file index blocks 222 which in the depicted example includes file index blocks 222a through 222e. The depicted file index blocks 222a-222c point to corresponding data files 250a-250c, creating a hierarchically-indexed system for each data file location.

The data files 250 typically include a series of data blocks linked by pointers to subsequent data blocks. For clarity, the data files 250a to 250c are shown as a single contiguous segment. As the data files 250 are modified, blocks may be added to a particular file by linking additional data blocks to the series of linked data blocks. Data blocks may also be deleted from a file by eliminating links to the deleted blocks. Similarly, data blocks may be modified within a file by overwriting the data in the linked blocks.

The file index blocks 222d and 222e point to snapshot files in the same manner as file index blocks 222a-222c point to data files. The depicted snapshot tracking system 230 is essentially a flat indexed file system that includes a map of snapshot instances 232 and associated snapshot files. A snapshot instance 240a includes the snapshot header 234a, the snapshot index 236a, and the archived data blocks 238a-238c. The archived data blocks 238a-238c are copies of data blocks from data files 250a-250c before they were deleted or overwritten as data files 250a-250c are modified subsequent to a preceding snapshot 240b. The snapshot 240b includes the snapshot header 234b, the snapshot index 236b and the archived data blocks 238d-238f.

Restoration of the snapshot instance 240a via a snapshot provider or the like allows the hierarchically-indexed data store 200 to be restored to the exact state that existed when snapshot instance 240a was taken. Successive application of snapshot instance 240a and snapshot instance 240b allow the hierarchically-indexed data store 200 to be restored to the exact state that existed when snapshot instance 240b was taken.

The current art, exemplified by the hierarchically-indexed data store 200 establishes snapshot data structures that facilitate a complete and consistent image for recovery purposes. Nevertheless, as depicted in FIG. 2, the current art for hierarchically-indexed systems is inefficient and complex compared to log-structured systems, and does not directly support snapshot-based asynchronous replication to a target data store.

Consequently, a need exists for devices, methods and systems that perform asynchronous log-like snapshot-based replication for non-log-structured file systems and associated data stores. Such devices, methods, and systems would provide the advantages of log-structured replication techniques to widely available hierarchically-indexed data storage systems.

SUMMARY OF THE INVENTION

The various elements of the present invention have been developed in response to the present state of the art, and in particular, in response to the problems and needs in the art that have not yet been fully solved by currently available data store replication means and methods. Accordingly, the present invention provides an improved apparatus, method, and system for asynchronous replication of a hierarchically-indexed data store.

In one aspect of the present invention, an apparatus for asynchronous file-based replication of a hierarchically-indexed data store includes a replication source having a hierarchically-indexed data store, a tracking module configured to track file regions that have changed on the replication source since a previous snapshot instance, and a replication module configured to communicate data contained within changed file regions in response to a subsequent snapshot instance.

The apparatus for asynchronous file-based replication of a hierarchically-indexed data store may also include a replication target configured to receive the data within changed file regions from the replication source, write the data within corresponding files regions on the replication target, and initiate a snapshot operation that synchronizes the replication target with the replication source.

In one embodiment, the replication module communicates the data contained within the changed file regions in an order that is independent of the order in which the data was written. Communicating in a different order facilitates optimized retrieval of the changed file regions from the hierarchically-indexed data store and any buffers or data caches associated therewith.

In certain embodiments, the apparatus includes a storage management module configured to set policies related to replication. The replication module may conduct replication operations as directed by such policies in order to reduce the complexity of managing replication operations.

The apparatus for asynchronous file-based replication of a hierarchically-indexed data store may also include a snapshot module configured to provide snapshot services. In certain embodiments, the snapshot module maybe a standard snapshot service module provided by a third party vendor or the like. In addition, the present invention uses a conventional file system such as a hierarchical file system and need not use a log-structured file system for efficient operation as required by previous solutions. The ability to use a standard snapshot service module and a conventional file system increases the usefulness of the present invention and facilitates deployment on a wide range of systems.

In certain embodiments, the tracking module uses a file system driver to track file regions that have changed since a previous snapshot instance. In one embodiment, the file system driver is an installable driver.

In another aspect of the present invention, a method for asynchronous file-based replication of a hierarchically-indexed data store includes storing data on a hierarchically-indexed data store, tracking file regions that have changed since a first snapshot instance, and communicating data contained within changed file regions in response to a second snapshot instance.

In certain embodiments, the data contained within the changed file regions may be communicated in an order different from the order in which the data is written to the data store. Data communication may also be conducted as directed by policies related to replication. In one embodiment, the method repeats replication operations at a configurable time interval.

Various elements of the present invention may be combined into a system for asynchronous file-based replication of a hierarchically-indexed data store. In one embodiment, the system includes a target volume, a source volume corresponding to a hierarchically-indexed data store, a tracking module configured to track file regions that have changed since a first snapshot instance, and a replication module configured to communicate data contained within changed file regions in response to a second snapshot instance.

The various elements and aspects of the present invention facilitate conducting replication operations on a hierarchically indexed data store with the same ease as is customarily associated with log-structured data stores. The present invention reduces the bandwidth and buffering requirements associated with synchronous replication and facilitates asynchronous replication of data in a flexible manner. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is a flow chart illustrating one embodiment of a changed regions tracking method of the present invention;

FIG. 5 is a flow chart illustrating one embodiment of a target update method of the present invention; and FIG. 6 is text-based diagram illustrating a change tracking data structure in accordance with the present invention.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 3:
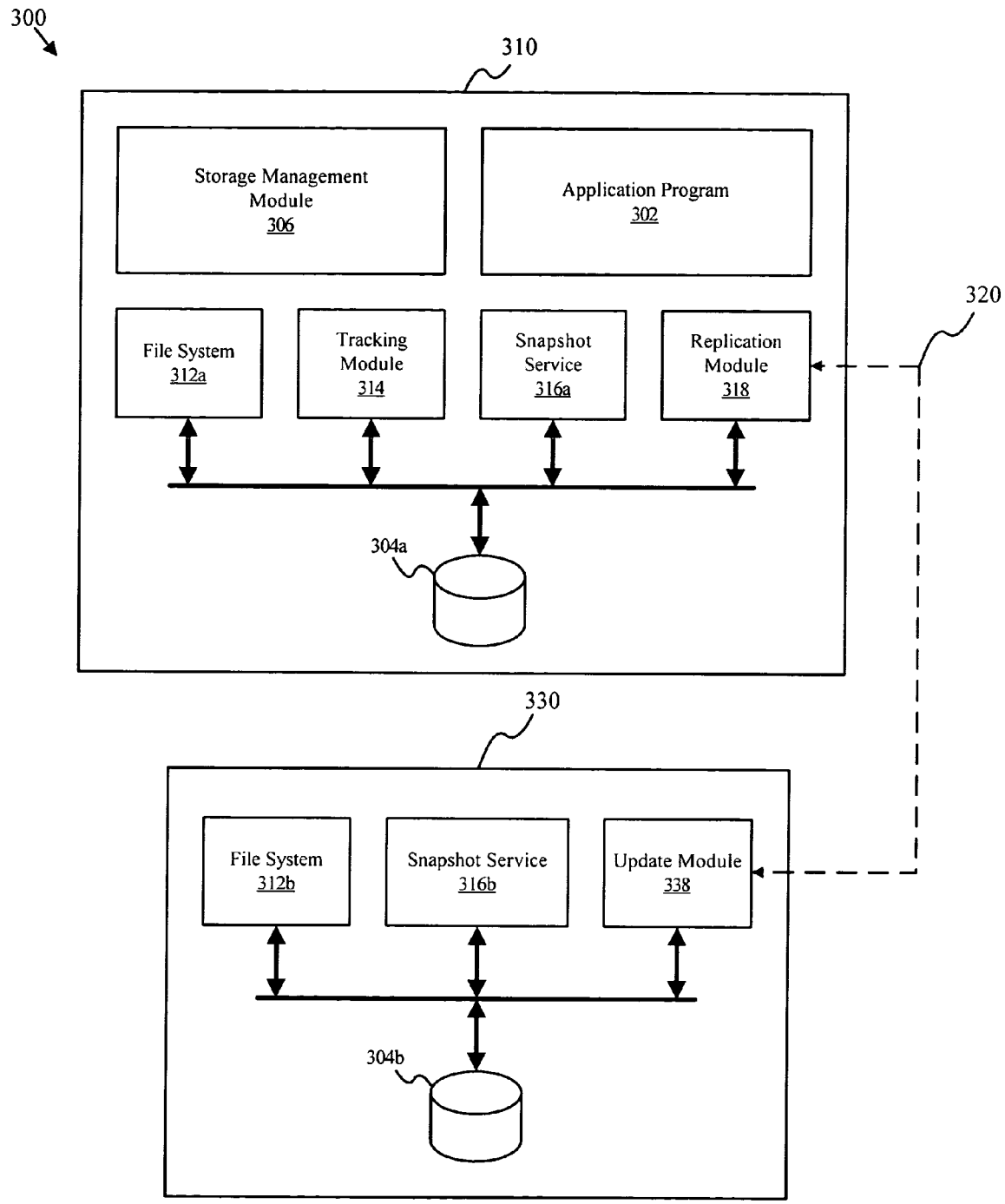
FIG. 3 is a block diagram illustrating one embodiment of an asynchronous replication system of the present invention.

FIG. 3 is a block diagram illustrating one embodiment of an asynchronous replication system 300 of the present invention. The depicted embodiment of the asynchronous replication system 300 includes a replication source 310, a communication link 320, and a replication target 330. The communication link 320 supports command and data transfer between a data replication module 318 associated with a source data store 304*a* and an update module 336 associated with a target data store 304*b*. In one embodiment, the source data store 304*a* and the target data store 304*b* may be the same data store or may be co-located within the same storage subsystem. In another embodiment, the target data store 304*b* is remotely located from the source data store 304*a*.

The replication source 310 and the replication target 330 include a number of elements related to data replication, including one or more data stores 304, a file system 312, and a snapshot service 316. The depicted embodiment of the data source 330 also includes an application program 302, a snapshot management module 304, a tracking module 314, and a replication module 318, while the depicted embodiment of the replication target 330 further includes an update module 336. A tracking mechanism, such as a block map 315 may be used and is in one embodiment an example of a data structure used for tracking changes during snapshot operations.

As depicted, the data stores 304 may contain one or more volumes comprised of logical subunits such as blocks, a volume may contain one or more files, and a file may contain one or more regions such as blocks or pages. A volume block map (not shown) may also be associated with each data store 304.

In one embodiment, the volume block map is a data structure that includes an entry for the overwrite status of all block addresses in the volume.

Figure 2:
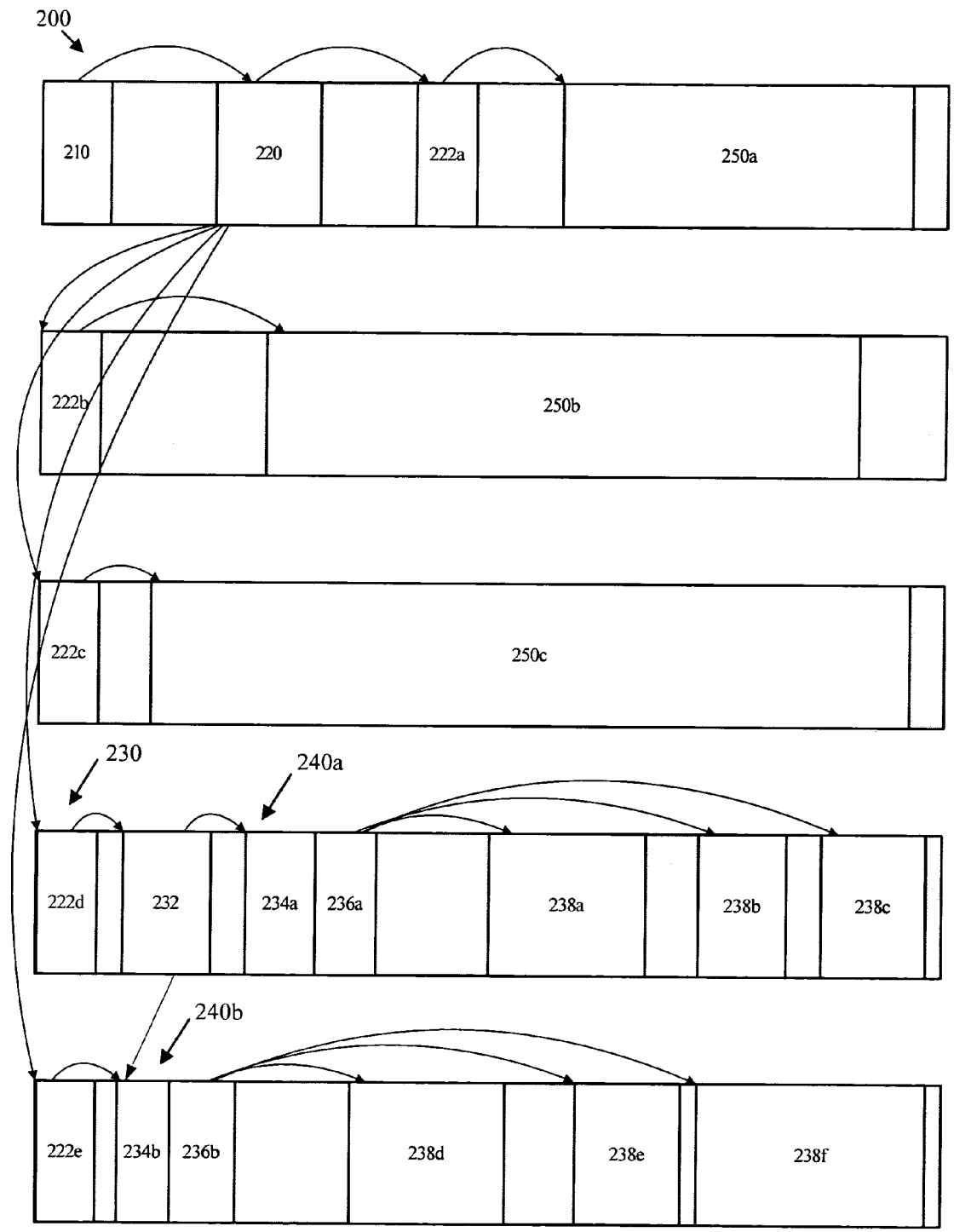
FIG. 2 is a block diagram illustrating a typical prior art hierarchically-indexed data store and associated snapshots.

The application program 302 uses the file system 312 to conduct file-oriented operations such as writing data to and reading data from the data store 304. The snapshot service 316 in one embodiment manages snapshot operations on the data store 304, as discussed for the prior art hierarchically-indexed data store 200 of FIG. 2. While the specific instance of a snapshot is discussed herein by way of example, one skilled in the art will readily recognize that the present invention may be employed using any type of point-in-time image replication operation.

The tracking module 314 keeps track of those regions that have changed within each file on the source data store 304*a* between successive snapshots (i.e. over a particular snapshot interval). In certain embodiments, as each snapshot is initiated, the tracking module 314 clears one or more block maps 315 that track changes to files on the data store 304 from memory. One example of a suitable block map 315 is discussed below with respect to FIG. 6. In certain embodiments, the tracking module 314 clears one or more block maps under direction of the replication module 318 as directed by snapshot management policies.

The replication module 318 interacts with the file system 312 to read the data blocks, or the like, from the source data store 304*a*, that have changed between successive snapshot instances. The retrieved data blocks may be transmitted to the replication target. If multiple changes were made to a particular data block during a snapshot interval, the last version of the data block is retrieved from the source data 304*a* and communicated to the replication target 330. By retrieving and communicating the last version corresponding to a snapshot interval, the processing and communication burden associated with replication may be significantly reduced.

In one embodiment, the replication module 318 uses one or more block maps 315 to ascertain the file regions that have changed over a particular snapshot interval. One example of a suitable block map 315 is the data structure 600 of FIG. 6. In the aforementioned embodiment, the tracking module 314 and the replication module 318 rotate between two or more block maps residing in memory. The replication module 318 may also interact with the update module 338 to transfer the changed data blocks to the replication target 330 over the communication link 320.

In response to the reception of the changed data blocks at the replication target 330, the update module 338 ensures that the changed data blocks are written to a proper location on the target data store 304*b*. In conjunction with writing the changed data blocks to the target data store 304*b*, the update module 338 may also interact with the snapshot service 316*b* to synchronize a snapshot image located on the source data store 304*a* with a corresponding snapshot image located on the target data store 304*b*. In one embodiment, synchronization of the snapshot images is accomplished by invoking a snapshot operation on the target data store 304*b* after all of the changed data blocks have been written to the target data store 304*b*.

The storage management module 306 may be included in certain embodiments of the present invention. The depicted storage management module 306 provides an interface and associated mechanisms for managing policies related to storage. For example, policies may establish the criteria for conducting snapshot or other data replication operations. In one embodiment, the criteria include the elapsed interval since a previous snapshot, the amount of available storage, the amount of recently changed data, and the like.

To implement policies, the storage management module 306 may communicate with the tracking module 314, the snapshot service 316a, and the file system 312a. The relationship between the storage management module and the aforementioned modules need not be exclusive. For example, the services provided by the snapshot service 316a, such as snapshot operations, may be invoked by an application, a utility, or the like, without affecting snapshot-based replication operations.

FIG. 4 is a flow chart illustrating one embodiment of a changed regions tracking method 400 of the present invention. The depicted embodiment of the changed regions tracking method 400 includes an initialize step 410, a store data step 420, a track changed regions step 430, a snapshot request test 440, a store tracking data step 450, and a communicate changed regions step 460. In one embodiment, the method 400 may be conducted using the system 300 of FIG. 3.

As depicted, the changed regions tracking method 400 starts coincident with creating a snapshot instance. The initialize step 410 initializes any data structures involved with tracking changed regions on a storage volume or portion thereof, such as a file. In one embodiment, the initialize step 410 constructs a blank block map for each volume to be replicated.

Figure 1:
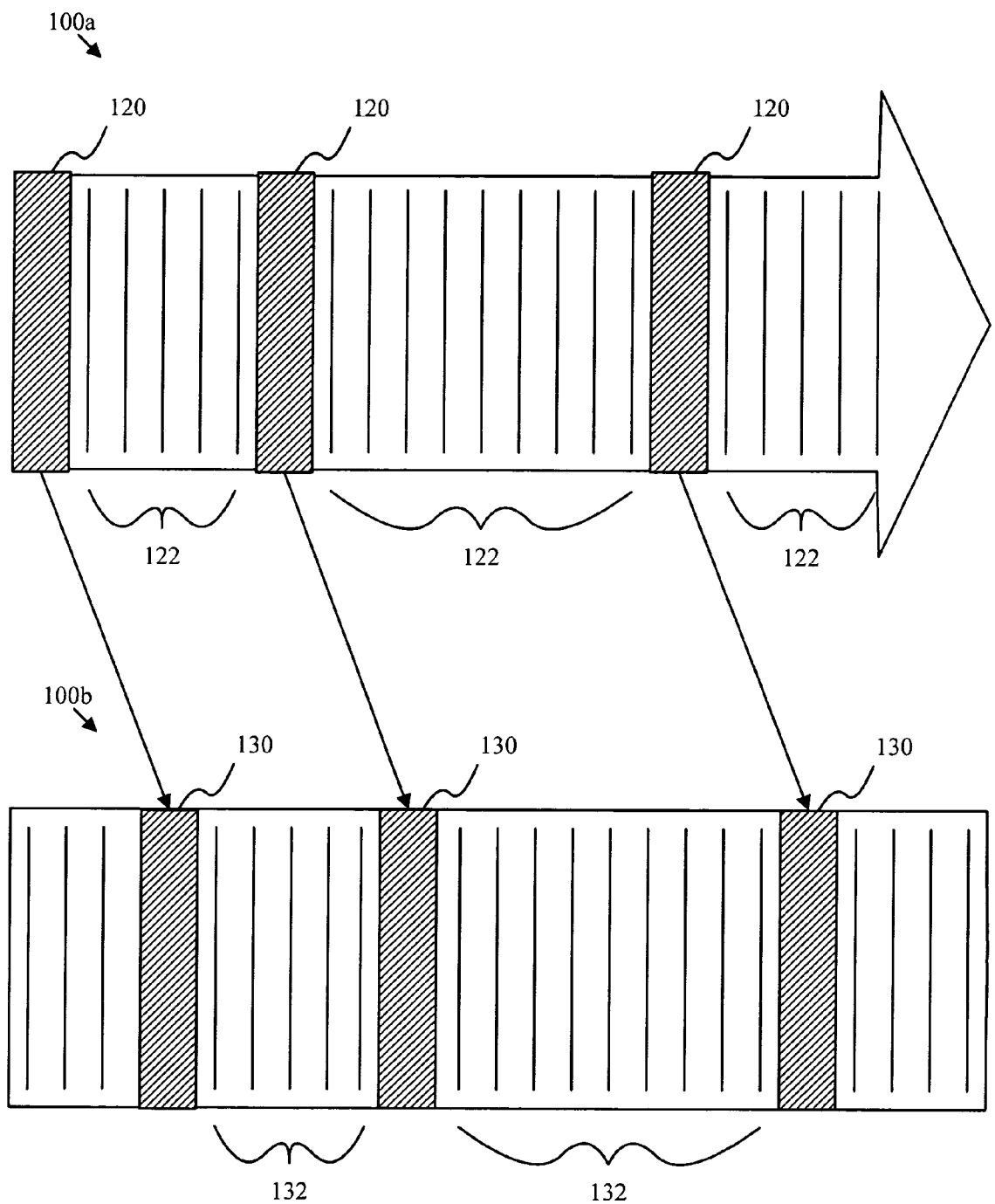
FIG. 1 is a block diagram illustrating a typical prior art log-structured mirrored data store and associated snapshots.

Subsequent to the initialize step 410, the depicted method 400 proceeds to the store data step 420. The store data step 420 stores data on a data store such as the source data store 304a depicted in FIG. 1. The store data step 420 may be conducted in response to a write request by the application program 302, or the like.

The track changed regions step 430 updates one or more data structures related to tracking changes. In one embodiment, the track changed regions step 430 sets one or more status fields within a block map 315. The volume block map 315 may be implemented with a suitable data structure such as that shown in FIG. 6. Preferably, the status fields indicate the updated status of all blocks written during the store data step 420. In one embodiment, the changed regions are file regions that were changed between snapshot instances. In another embodiment, knowledge of the relationship between the block-level changes and file region changes (as stored within a snapshot) facilitates using block-level changes in place of file-level changes in the present invention.

As depicted in FIG. 4, the store data step 420 and track changed regions step 430 iterate until the snapshot request test 440 is affirmative. In response to an affirmative snapshot request, the method proceeds to the store tracking data step 450. Otherwise, the changed regions tracking method 400 loops to the store data step 420.

At the store tracking data step 450, the tracking data is captured and stored for use with the communicate changed regions step 460. In one embodiment, the store tracking data step 450 involves storing a block map 315 (e.g., the data structure 600 of FIG. 6) containing status information indicating whether a block associated with a file region has been changed. In certain embodiments, multiple tracking data structures may be rotated between the tracking module 314, and the replication module 318, and the store tracking data step 450 may be omitted.

The communicate changed regions step 460 communicates to a replication target the file regions that have changed over a snapshot interval. The communicate changed regions step 460 may be conducted asynchronous to the rest of the method 400. One advantage of asynchronous execution is that the communicate changed regions step 460 may be deferred to a convenient time or it may be conducted as a background process.

The communicate changed regions step 460 may communicate the changes to a replication target in any suitable order. For example, the changes may be sorted in an order that optimizes retrieval of the changed data from a data store. In certain embodiments, the communicate changed regions step 460 extracts information from the tracking data structures stored during the store tracking data step 450 and includes that information in the conducted communications.

Subsequent to completion of the communicate changed regions step 460, the depicted changed regions tracking method 400 terminates at an end step 470. The method 400 facilitates snapshot-based data replication from a replication source having a hierarchically-indexed data store, or the like. While the depicted method 400 is shown in a certain sequential order, many real-time, multi-threaded, or event driven forms of the present method may be derived under the present invention in a manner that will be readily apparent to those of skill in the art.

FIG. 5 is a flow chart illustrating one embodiment of a target update method 500 of the present invention. The depicted embodiment of the target update method 500 includes a receive changed data step 510, a write changed regions step 520, a conduct snapshot step 530, and an end step 540. The target update method 500 may be conducted in conjunction with a replication target such as the replication target 330 depicted in FIG. 3.

The receive changed data step 510 receives the changed regions associated with a snapshot interval on a source system. In one embodiment, the regions are file regions that were changed between snapshot instances. In another embodiment, the regions are block-level changes to a volume or portion thereof. Subsequent to the receive changed data step 510, the target update method 500 proceeds to the write changed regions step 520.

The write changed regions step 520 writes data received from the replication source to a target volume such as the replication target 330. In one embodiment, the replication source and target are essentially identical (including identical file systems, snapshot services, and snapshot storage formats), and the data is written as block level changes. In another embodiment, the file system on the replication target is different than the replication source and the changes are written as file-level changes.

The conduct snapshot step 530 synchronizes the replication target with the replication source by conducting a snapshot operation subsequent to writing all the changed regions associated with a snapshot interval on the replication source. Synchronizing the replication target with the replication source facilitates conducting recovery operations in the event of a disaster, or the like, or conducting rollback operations, such as restarting payroll processing.

Some aspects of the target update method 500 may be conducted concurrently. For example, in one embodiment, the write changed regions step and the conduct snapshot step may be conducted concurrently with the receive changed data step 510 associated with a subsequent snapshot. In certain embodiments, additional replication-related write operations (i.e. the write changed regions step 520) associated with subsequent snapshots are blocked until a presently conducted snapshot operation is completely finished.

FIG. 6 is a text-based diagram illustrating one embodiment of a change tracking data structure 600 of the present invention. The change tracking data structure 600, or a data structure with a similar function, may be used by the tracking module 314, the replication module 318, the update module 338, the changed regions tracking method 400, and the target update method 500 in order to conduct snapshot-based replication operations between a replication source, such as the replication source 310, and a replication target, such as the replication target 330.

As depicted, the change tracking data structure 600 includes a block index 610, a block address 620, a status indicator 630, a file index 640, and a region address 650. The depicted embodiment of the change tracking data structure 600 is essentially a block map corresponding to a specific snapshot interval. The change tracking data structure 600 may also include other information useful in tracking changes. Such information may include caching information.

The block index 610 functions essentially as a logical identifier for a block associated with a particular volume, or the like. In contrast, the block address 620 preferably identifies a physical location of the actual block within the physical media of a storage device. In one embodiment, volumes may be distributed across multiple storage devices and the block address also includes a device identifier.

The status indicator 630 indicates the status of the block, particularly whether a change was made to the block since a previous snapshot. The file index 640 identifies the file associated with the data block, while the region address 650 indicates the file region associated with the particular data block.

As implied by the flexibility of the change tracking data structure 600, the present invention may be used to replicate specific files or entire volumes to a replication target. Consequently, the present invention may be used to maintain point-in-time retrievable images of a volume or portion thereof on a target volume while reducing the amount of data necessary to replicate and store source volume changes on the target volume. In addition, the present invention works with conventional hierarchically-indexed file systems and data stores and does not require a log-structured file system and associated data store for efficient operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for asynchronous file-based replication of a hierarchically-indexed data store, the apparatus comprising:
    a hierarchically indexed data store configured to store data in a hierarchical structure corresponding to a file system;
    an operating system configured to access the hierarchically indexed data store and initiate write operations to the hierarchically indexed data store;
    a first in-memory block map for tracking changes to the hierarchically indexed data store, the first in-memory block map comprising a plurality of status indicators configured to indicate changes to blocks on the hierarchically indexed data store;
    a second in-memory block map for tracking changes to the hierarchically indexed data store, the second in-memory block map comprising a plurality of status indicators configured to indicate changes to blocks on the hierarchically indexed data store;
    a tracking module comprising a file system driver configured to monitor write operations initiated by the operating system and track file regions that have changed since a first point-in-time replication instance by updating the status indicators in the second in-memory block map in a written order;
    a replication module configured to asynchronously communicate data contained within file regions that have changed to a replication target as indicated by the first in-memory block map;
    the file system driver further configured to access the first in-memory block map instead of the second in-memory block map in response to a second point-in-time replication instance;
    the replication module further configured to access the second in-memory block map instead of the first in-memory block map in response to the second point-in-time replication instance and asynchronously communicate data contained within file regions that have changed to the replication target as indicated by the second in-memory block map, wherein the data is communicated in an order that is independent of the written order.

2. The apparatus of claim 1, further comprising a replication target configured to asynchronously receive the data contained within the file regions that have changed from the replication module, write the data within corresponding files regions on the replication target, and initiate a point-in-time image replication operation configured to synchronize the replication target with the hierarchically indexed data store as structured at the second point-in-time replication instance.

3. The apparatus of claim 1, wherein the replication module is further configured to clear the first in-memory block map subsequent to asynchronously communicating the data contained within the file regions indicated by the first in-memory block map.

4. The apparatus of claim 1, wherein the replication module is further configured to conduct replication operations as directed by policies related to replication.

5. The apparatus of claim 1, further comprising a storage management module configured to set policies related to replication.

6. The apparatus of claim 1, further comprising a point-in-time image replication module configured to provide point-in-time image replication services to the hierarchically-indexed data store.

7. The apparatus of claim 1, wherein the tracking module is further configured to save information regarding the file regions that have changed since the first point-in-time image replication instance.

8. The apparatus of claim 1, wherein the file system driver is an installable driver.

9. The apparatus of claim 1, wherein the point-in-time image replication comprises a snapshot of the root node.

10. A computer readable storage medium storing computer readable program code for conducting a method for asynchronous file-based replication of a hierarchically-indexed data store, the method comprising:
    asynchronously communicating data contained within file regions that have changed to a replication target as indicated by a first in-memory block map;
    monitoring write operations to a hierarchically-indexed data store with a file system driver in order to track file regions that have changed since a first point-in-time replication instance wherein changes to the file regions occur in a written order;
    updating block status indicators in a second in-memory block map in response to the changes to the file regions;
    clearing the first in-memory block and updating block status indicators in the first in-memory block map instead of the second in-memory block map in response to a second point-in-time replication instance;

asynchronously communicating data contained within file regions that have changed to the replication target as indicated by the second in-memory block map instead of the first in-memory block map in response to the second point-in-time replication instance, wherein asynchronously communicating data occurs in an order that is independent of the written order.

11. The computer readable storage medium of claim 10, wherein the method further comprises receiving the data contained within the file regions that have changed, writing the data within corresponding files regions on a replication target, and initiating a point-in-time image replication operation configured to synchronize the replication target with the replication source.

12. The computer readable storage medium of claim 10, wherein the method further comprises clearing the first in-memory block map subsequent to asynchronously communicating the data contained within the file regions indicated by the first in-memory block map.

13. The computer readable storage medium of claim 10, wherein the method further comprises communicating is conducted as directed by policies related to replication.

14. The computer readable storage medium of claim 10, wherein the method further comprises invoking point-in-time image replication services.

15. The computer readable storage medium of claim 10, wherein the method further comprises saving information regarding the file regions that have changed since the first point-in-time image replication instance.

16. The computer readable storage medium of claim 10, wherein the method further comprises tracking file regions is conducted in response to write operations.

17. The computer readable storage medium of claim 10, wherein the method further comprises saving information regarding the storage regions that have changed since the first point-in-time image replication instance.

18. The computer readable storage medium of claim 10, wherein the point-in-time image comprises a snapshot.

* * * * *